US011566657B2

(12) United States Patent
Kiełbowicz et al.

(10) Patent No.: US 11,566,657 B2
(45) Date of Patent: Jan. 31, 2023

(54) VIBRATION RESISTANT TORSIONALLY COMPLIANT TRANSMISSION SHAFT

(71) Applicant: Goodrich Corporation, Charlotte, NC (US)

(72) Inventors: Dariusz Kiełbowicz, Boleslawiec (PL); Maciej Krulak, Warsaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 399 days.

(21) Appl. No.: 16/697,485

(22) Filed: Nov. 27, 2019

(65) Prior Publication Data
US 2020/0347875 A1    Nov. 5, 2020

(30) Foreign Application Priority Data

May 2, 2019    (EP) ..................... 19461531

(51) Int. Cl.
*F16C 3/02*         (2006.01)
*B64C 13/28*        (2006.01)
(Continued)

(52) U.S. Cl.
CPC ............... *F16C 3/02* (2013.01); *B64C 13/28* (2013.01); *F16C 1/02* (2013.01); *F16C 1/08* (2013.01);
(Continued)

(58) Field of Classification Search
CPC ...... F16C 3/02; F16C 1/02; F16C 1/08; F16C 2202/02; F16C 2208/02; F16C 2220/48;
(Continued)

(56) References Cited

U.S. PATENT DOCUMENTS 1,339,970 A * 5/1920 Murray, Jr. ........... B21C 37/202
                                              72/370.16
2,000,997 A * 5/1935 Sharpe ..................... F16C 1/02
                     (Continued)

FOREIGN PATENT DOCUMENTS

CN          206111820 U     4/2017
DE          4010901 A1     10/1991
                 (Continued)

OTHER PUBLICATIONS

European Search Report for European Application No. 19461531.6, International Filing Date May, 2 2019, dated Nov. 15, 2019, 11 pages.

*Primary Examiner* — Greg Binda
(74) *Attorney, Agent, or Firm* — Cantor Colburn LLP

(57) ABSTRACT

A transmission shaft is provided comprising an input side for inputting torque, an output side for outputting torque, and a rod extending in a longitudinal direction between the input side and the output side to transfer torque along the transmission shaft. The rod comprises a first end provided at the input side, a second end provided at the output side and a torsional compliant section extending therebetween providing the transmission shaft with a torsional stiffness. The torsional compliant section comprises a cross-section which extends in the longitudinal direction to define a central core for transmitting torque directly from the first end to the second end and a radially outer section. This section also comprises a plurality ribs which extend radially and longitudinally from an outer periphery of the central core for increasing transverse stiffness of the rod.

14 Claims, 8 Drawing Sheets

(51) Int. Cl.
*F16C 1/02* (2006.01)
*F16C 1/08* (2006.01)

(52) U.S. Cl.
CPC ...... *F16C 2202/02* (2013.01); *F16C 2208/02* (2013.01); *F16C 2220/48* (2013.01); *F16C 2226/00* (2013.01); *F16C 2326/06* (2013.01); *F16C 2326/43* (2013.01)

(58) Field of Classification Search
CPC ............. F16C 2226/00; F16C 2326/06; F16C 2326/43; B64C 13/28
USPC ................................ 464/97, 181; 72/370.16
See application file for complete search history.

(56) References Cited

U.S. PATENT DOCUMENTS

| | | | | |
|---|---|---|---|---|
| 2,822,677 | A * | 2/1958 | Reynolds | F16F 1/16 |
| | | | | 464/97 |
| 3,869,877 | A * | 3/1975 | Brahler | F16C 1/02 |
| | | | | 464/97 |
| 5,894,753 | A * | 4/1999 | Sachot | B21J 7/145 |
| | | | | 72/370.16 |
| 9,527,368 | B2 | 12/2016 | Raymond | |
| 10,295,042 | B2 * | 5/2019 | Russ | F16C 3/02 |
| 10,531,610 | B2 * | 1/2020 | Fohrenbach | B27B 5/30 |
| 11,020,827 | B2 * | 6/2021 | Pattok | F16C 1/08 |
| 2012/0001397 | A1 | 1/2012 | McLaughlin | |
| 2017/0191559 | A1 | 7/2017 | Russ | |

FOREIGN PATENT DOCUMENTS

| | | |
|---|---|---|
| EP | 3128196 A1 | 2/2017 |
| WO | 2018050812 A1 | 3/2018 |

* cited by examiner

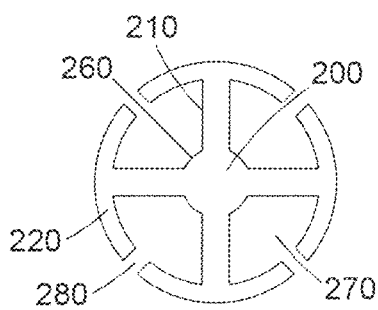
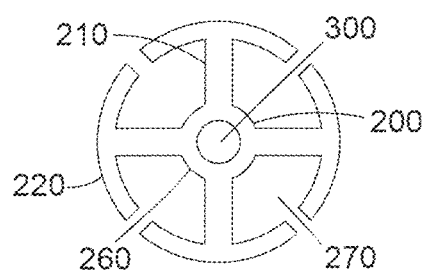
Fig. 3A    Fig. 3B
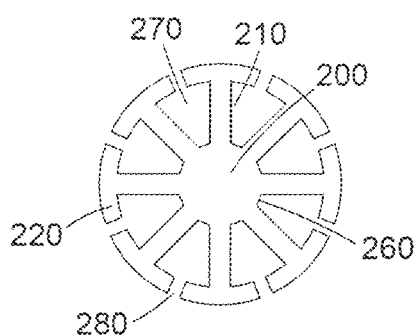
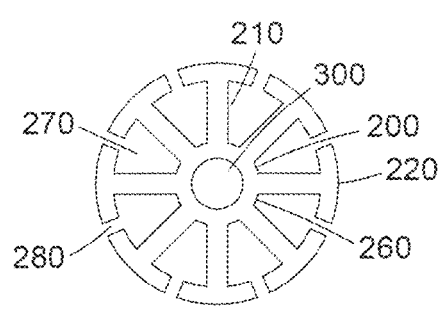
Fig. 4A    Fig. 4B

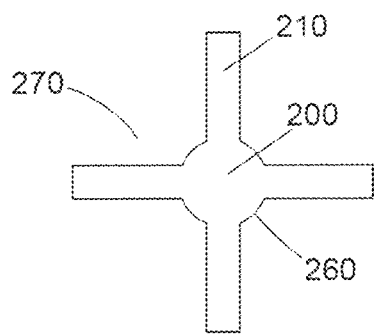 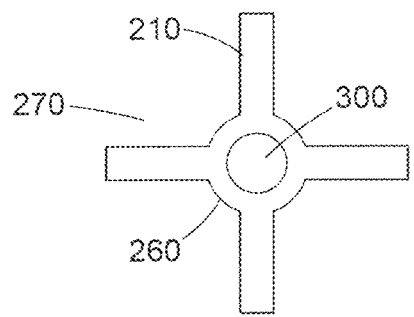
Fig. 7A          Fig. 7B
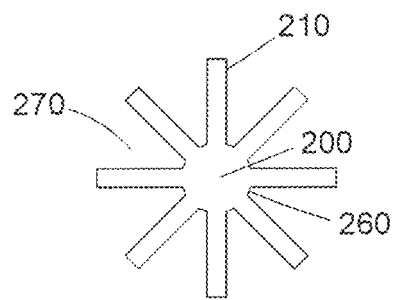 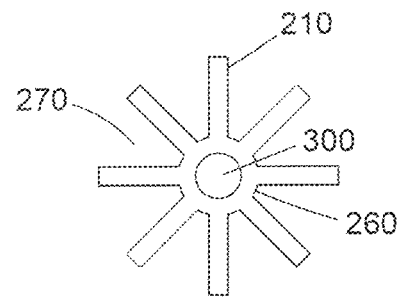
Fig. 8A          Fig. 8B

VIBRATION RESISTANT TORSIONALLY COMPLIANT TRANSMISSION SHAFT

FOREIGN PRIORITY

This application claims priority to European Patent Application No. 19461531.6 filed May 2, 2019, the entire contents of which is incorporated herein by reference.

FIELD

The present disclosure relates to a transmission shaft, for example, for a power transmission shaft assembly, and to a method of manufacturing such a transmission shaft.

BACKGROUND

In some power transmission systems there is a need for torsional compliance in a transmission shaft. The term "transmission shaft" used herein refers to any form of shaft which is used to transfer torque between two components, for example, a driveshaft, actuator shaft, or other output shaft delivering rotational movement. Torsional compliant shafts can act as springs, protecting the rest of the transmission system from sudden spikes of torque originating from jams or sudden changes of load.

Currently, the torsional compliance is usually obtained by replacing a torsionally stiff section of a transmission shaft, typically in the form of a tube, with a solid rod of narrower section. The solid rod is less rigid in torsion than the tube section of the transmission shaft and provides the power transmission system with a degree of torsional compliance.

The problem with such a solution is that a solid rod design also does not have as much stiffness in a transverse direction as a tubular shaft. As a result it can be susceptible to harmonic vibration induced by nearby components such as engines, compressors or pumps. If the frequency of these nearby components is close to the natural frequency of the shaft it can induce resonance in the shaft. This resonance is more significant during a failure such as a loss of a rotor blade in an engine, which leads to a rotor imbalance. In these circumstances the vibrations in the rod can become severe and cause large deflections in the shaft and may lead to failure of the shaft or cause it to impact other components.

In normal use, when the transmission shaft is transferring torque between an input side and an output side of the transmission shaft, any oscillations in the rod would be generally within predetermined limits, though it is also possible for resonance to set in at certain harmonic frequencies. Large oscillation amplitudes, for example, during "one-off" events, can induce large stresses in the transmission shaft which can lead to component failure.

The transmission shaft will also experience large deflections in normal use. The transmission shaft is typically employed in areas where it is desired to reduce space and arrange components together compactly. The transmission shaft will therefore be positioned very close to other components. Large deflections in the shaft can therefore cause the shaft to impact the other nearby components resulting in further damage to the overall system.

On aircraft there are different design stipulations for how much transverse (lateral) deflection can be allowed in a transmission shaft during normal use as well as during such "one-off" events when spikes of torque may be experienced. These amounts may depend on where the transmission shaft is positioned on the aircraft, for example, whether it is within the wing, in which case stricter requirements may apply. Any transmission shaft within the wing of the aircraft will also be closer to the engine which is a source of significant vibrations which may induce failure.

It has been found that the existing solution, while it can provide the necessary torsional compliance to a power transmission system, is not able to satisfy some of the stricter requirements in terms of deflection experienced when subjected to vibrations induced by nearby components. There is therefore a desire to reduce amplitude of oscillation in a transmission shaft that comprises a rod with a torsional compliant section. There may also be benefits in reducing the amplitude of oscillation in such a transmission shaft at other times.

SUMMARY

Viewed from a first aspect the present disclosure provides a transmission shaft comprising, a first side for inputting torque, a second side for outputting torque, and a rod extending in a longitudinal direction between the first side and the second side to transfer torque along the transmission shaft. The rod comprises a first end provided at the first side, a second end provided at the second side and a torsional compliant section extending therebetween providing the transmission shaft with a torsional stiffness. The torsional compliant section comprises a cross-section which extends in the longitudinal direction to define a central core for transmitting torque directly from the first end to the second end and a radially outer section comprising a plurality ribs which extend radially and longitudinally from an outer periphery of the central core for increasing transverse stiffness of the rod.

The first end of the rod and the first side of the transmission shaft may be coupled through a first circumferentially extending interface to deliver torque into the torsional compliant section, i.e., from the first side to the first end. The second end of the rod and the second side of the transmission shaft may be coupled through a second circumferentially extending interface to deliver torque out of the torsional compliant section, i.e., from the second side to the second end. End surfaces of the ribs of the torsional compliant section may be spaced from the first and second circumferentially extending interfaces. In other words the ribs may terminate before the first and second circumferentially extending interfaces. In this way the ribs may be de-coupled, as far as possible, from direct transmission of torque from the input side to the output side through the ribs.

In embodiments, the input side may be arranged to transmit torque into the first end of the rod through the central core only. The ribs may be configured to be functionally isolated at the first end from the inputted torque as the torque enters the rod.

In addition or alternatively the output side may be arranged to transmit torque out of the second end of the rod through the central core only. The ribs may be configured to be functionally isolated at the second end from the outputted torque as the torque exits the rod.

In embodiments, the first side may be arranged to transmit torque into the first end of the rod through a first portion of a circumferential outer surface of the central core only, the ribs comprising first end surfaces which extend from the circumferential outer surface spaced from the first side and the first circumferentially extending interface so as to be functionally isolated from the inputted torque as the torque enters the first end of the rod. The second side may be arranged to transmit torque out of the second end of the rod through a second portion of the circumferential outer surface of the central core only, the ribs comprising second end surfaces which extend from the circumferential outer surface spaced from the second side and the second circumferentially extending interface so as to be functionally isolated from the outputted torque as the torque exits the second end of the rod.

The transmission shaft may provide a primary load path for torque to pass along between the first side and the second side of the transmission shaft via the central core of the rod. The rod may be coupled to the first side and the second side so that the primary load path can only enter the first end of the rod through the central core and/or only exit from the second end of the rod through the central core.

There may be no direct connection at either the first or the second end of the rod to provide a primary load path for torque to pass between the first side and the second side via the ribs.

In embodiments, the first end may be viewed as the input end and the second end may be viewed as the second end.

The transmission shaft comprises a longitudinal axis which will be linear when no torsional or lateral forces are present.

The rod may comprise a continuous cross-section.

The rod may have four or more ribs arranged around the central core. For example, the rod may have six or eight ribs.

The central core may have an outer diameter dimension which is more than twice the lateral thickness of any rib. For example, the central core may have an outer diameter dimension which is three times or more the lateral thickness of any rib.

The ribs may be arranged around a hollow central core.

Fillet portions may be provided at the radially inner end of the ribs where they join the outer periphery of the central core.

The ribs or a plurality of the ribs may comprise a laterally extending flange arranged at a radially outer end of the rib, the flange may extend in a generally circumferential or tangential direction to the rib.

Each flange may be arranged symmetrically at the radially outer end of the rib with the rib extending along a midline of the flange.

The laterally extending flange of one rib may be spaced from the laterally extending flange of an adjacent rib such that an axially-extending gap is present between the flanges under all working torsional loads.

The transmission shaft may comprise a first flexible coupling provided at the first/input side with a universal joint or self-aligning bearing for inputting torque and a second flexible coupling provided at the second/output side with a universal joint or self-aligning bearing for outputting torque.

The rod may comprise a composite material.

The rod may comprise fibres extending longitudinally the entire length of the rod.

The transmission shaft may be for an aircraft.

The transmission shaft may be for driving an actuator in a wing of the aircraft.

The transmission shaft may be able to comply with the High Level Short Duration (HLSD) curve P (+/−10G n–pk) of the DO160G requirements.

Viewed from a second aspect the present disclosure provides a method of making a transmission shaft, the transmission shaft comprising a first side for inputting torque, a second side for outputting torque, a rod extending in a longitudinal direction between the first side and the second side to transfer torque along the transmission shaft, the rod comprising a first end provided at the first side, a second end provided at the second side and a torsional compliant section extending therebetween providing the transmission shaft with a torsional stiffness. The rod comprises a cross-section which extends in the longitudinal direction to define a central core for transmitting torque directly from the first end to the second end and a radially outer section comprising a plurality ribs which extend longitudinally and radially from an outer periphery of the central core for increasing transverse stiffness of the rod. The method comprises coupling the first side to the first end and coupling the second side to the second end without coupling the ribs at the first and/or second ends.

The coupling of the first end of the rod and the first side of the transmission shaft may be through a first circumferentially extending interface which is able to deliver torque into the torsional compliant section from the first side to the first end. The coupling of the second end of the rod and the second side of the transmission shaft may be through a second circumferentially extending interface which is able to deliver torque out of the torsional compliant section from the second side to the second end. The ribs of the torsional compliant section may be formed so as to terminate before the first circumferentially extending interface and the second circumferentially extending interface. In this way there may be no direct transmission of torque, at least as far as possible, between the first side and the second side via the ribs.

The rod may be formed by extrusion or pultrusion through a die defining the cross-section of the rod.

The method may comprise forming the central core with a longitudinally extending cavity provided therein.

The method may comprise forming the ribs or at least a plurality of the ribs with a circumferentially or tangentially extending flange.

Each flange may be formed symmetrically at a radially outer end of the rib.

Viewed from a further aspect, there is also provided an aircraft transmission shaft for use in a wing or fuselage to drive an actuator, comprising a first side for inputting torque, a second side for outputting torque, and a rod extending in a longitudinal direction between the first side and the second side to transfer torque along the transmission shaft, the rod comprising a first end provided at the first side, a second end provided at the second side and a torsional compliant section extending therebetween providing the transmission shaft with a torsional stiffness, wherein the torsional compliant section comprises a cross-section which extends in the longitudinal direction to define a central core for transmitting torque directly from the first end to the second end and a radially outer section comprising a plurality ribs which extend radially and longitudinally from an outer periphery of the central core for increasing transverse stiffness of the rod. The aircraft transmission shaft of this aspect may additionally comprise any of the features described in the above statements, in any combination.

BRIEF DESCRIPTION OF THE DRAWINGS

Certain embodiments of the disclosure will now be described below by way of example only and with reference to the accompanying drawings, in which:

FIG. 3A shows a cross-section of a central section of an exemplary transmission shaft in accordance with the present disclosure comprising a solid central core;

FIG. 3B shows a cross-section of a central section of an exemplary transmission shaft in accordance with the present disclosure comprising a hollow central core;

FIG. 4A shows a cross-section of a central section of an exemplary transmission shaft in accordance with the present disclosure comprising a solid central core;

FIG. 4B shows a cross-section of a central section of an exemplary transmission shaft in accordance with the present disclosure comprising a hollow central core;

FIG. 7A shows a cross-section of a central section of an exemplary transmission shaft in accordance with the present disclosure comprising a solid core;

FIG. 7B shows a cross-section of a central section of an exemplary transmission shaft in accordance with the present disclosure comprising a hollow core;

FIG. 8A shows a cross-section of a central section of an exemplary transmission shaft in accordance with the present disclosure comprising a solid core;

FIG. 8B shows a cross-section of a central section of an exemplary transmission shaft in accordance with the present disclosure comprising a hollow core;

DETAILED DESCRIPTION

Figure 1A:
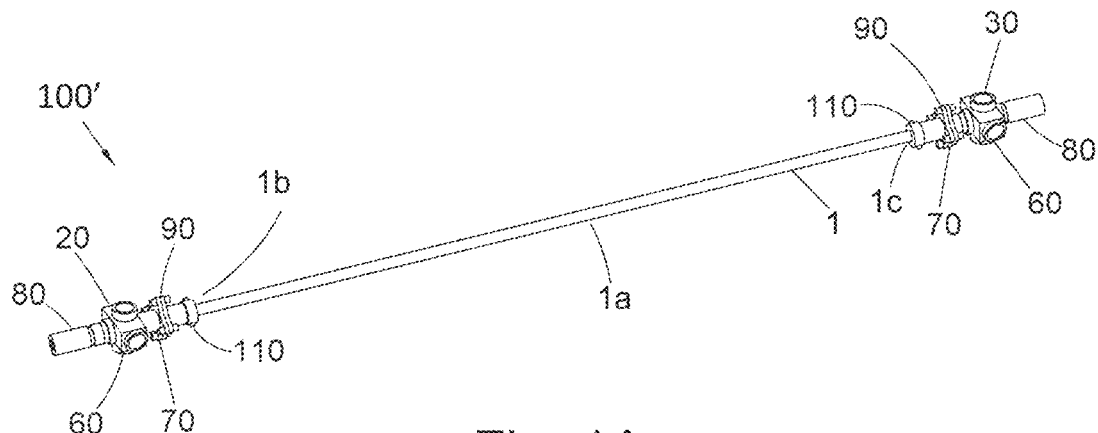
FIG. 1A shows a perspective view of a known transmission shaft with a torsional compliant section in a neutral position.
Figure 1B:
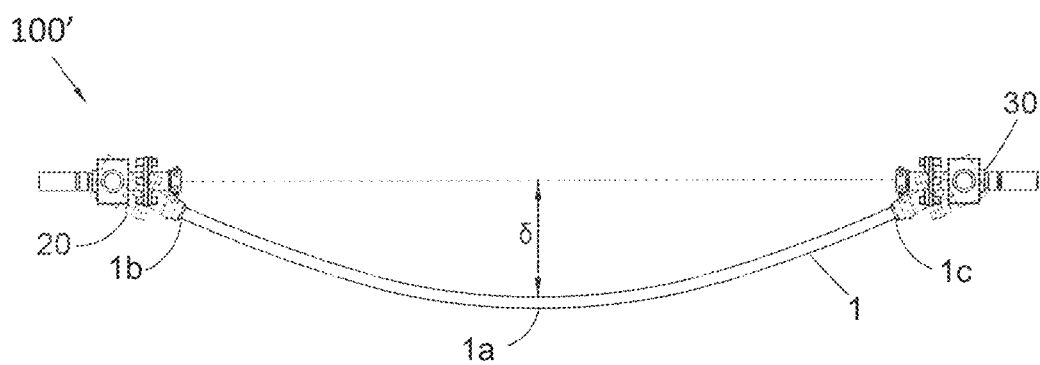
FIG. 1B shows the transmission shaft of FIG. 1a under deflection.

FIGS. 1A and 1B show an example of a transmission shaft 100' with a rod 1 extending between an input side 20 (first side) and an output side 30 (second side) of the transmission shaft 100'. In this example, the input side 20 is for inputting torque to the transmission shaft 100' and the output side 30 is outputting torque from the transmission shaft 100'. Torque can also be delivered in the other direction via the transmission shaft, in which case the first and second sides are swapped over.

The input side 20 and the output side 30 may comprise flexible couplings 70, for example, comprising a universal joint 60 or other form of torque connector, that are connected to a first end 1c and a second end 1c of the rod 1. The transmission shaft 100' may be coupled with two such flexible couplings to provide a power transmission shaft assembly for a drive train. The flexible couplings 70 may be identical on the input side 20 and output side 30.

Figure 11:
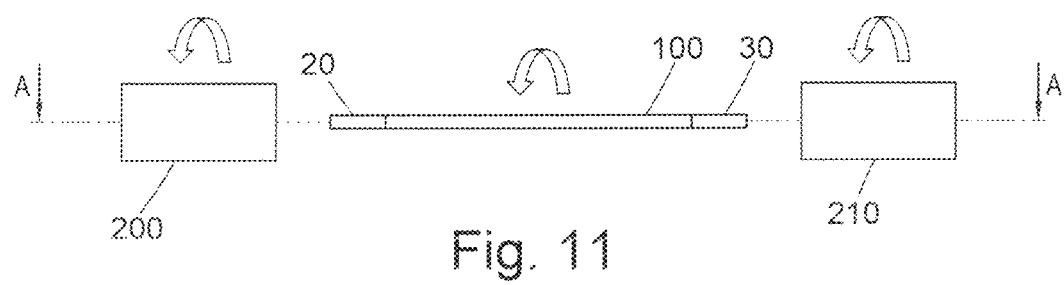
FIG. 11 shows a schematic representation of an exemplary power transmission system.

The flexible couplings 70 may comprise a fitting 80 on one side of the universal joint 60, and a torque plate 90 and connector mount 110 on the other (rod) side of the universal joint 60, for example as shown, though other arrangements are possible. The flexible couplings can be used to connect the input side 2 and the output side 3 of the transmission shaft 100', respectively, to other components in the drive train or transmission system. As shown in FIG. 11, fitting 80 at the input side 2 can receive torque from a component 150 upstream of the fitting 80 such as a motor, gearbox or power transmission shaft and couple that torque through the universal joint 60 and the torque plate 90 and connector mount 110 into the first end 1b of the rod 1.

Similarly, at the output side 30, a second torque connector 70 comprising a torque plate 90, a universal joint 60 and a fitting 80, can receive torque from the second end 1b of the rod 1 and output the torque to a component 160 downstream of the transmission shaft 100', for example, an actuator, a gearbox, generator, or other component requiring a rotational drive.

The flexible coupling 60 may comprise any type of coupling for example self-aligning bearings.

The rod 1 extends longitudinally from the first end 1b to the second end 1c for transferring the torque between the input side 20 and the output side 30 of the transmission shaft 100'. As shown in FIG. 1A, the rod 1 additionally comprises a torsional compliant section 1a, extending between the first end 1b and the second end 1c. The torsional compliant section 1a may extend the full length between the wider diameter first end 1b and the second end 1c.

The torsional compliant section 1a is provided to allow the transmission shaft 100' to respond to and to take up sudden spikes in torque. The rod 1 is compliant in a torsional direction to allow the shaft to twist and act as a spring to protect the other components of the transmission system. For such torsionally compliant transmission shafts, the rod 1 is typically a solid rod and the torsional compliant section 1a is an extended section between the ends that is of reduced diameter, providing a spring-like torsional resilience to the transmission system.

FIG. 1A shows the transmission shaft 100' in a neutral position. By the term "neutral position" used herein, it is meant the position that the transmission shaft 100' naturally adopts at rest as well as positions during normal use where the differences in torque between the first and second ends 1b, 1c are relatively small compared to a full working range of allowable deflection, e.g., when small oscillations within the rod 1 may be present. Thus, "neutral position" includes the condition where there is a minor amount of deflection along the rod 1 in accordance with normal operational tolerances at the lower end of the working range.

By contrast, FIG. 1B shows the known transmission shaft 100' in use when significant oscillations are experienced having an excessive amplitude, i.e., towards the upper end of a working range. Such oscillations may be experienced during use when harmonic resonance is encountered, but more particularly can be witnessed as a result of a component failing or jamming, such as a rotor blade being lost from an engine causing a rotor imbalance.

Part of the trade-off of providing a transmission shaft 100' with a torsional compliant section 1a is that the torsional compliant section 1a is naturally more flexible and so will lack the lateral stiffness of a regular transmission shaft 100', for example, which may comprise a tubular section of wider diameter having much greater lateral stiffness. As a result, the torsional compliant section 10a is more susceptible to harmonic vibration.

It has been found during testing that this existing design of compliant transmission shaft 100 can fail under the High Level Short Duration (HLSD) curve P (+/−10G n–pk) of the DO160G requirements. DO160G outlines a set of minimum requirements and specifies testing procedures for airborne equipment. The existing design can be seen to undergo severe deflection, which in turn can lead to large internal stresses. For example, a transmission shaft 100' of approximately 1-2m length might undergo up to 15 cm of displacement under the 10G amplitude harmonic vibration which would cause it to impact neighbouring components.

Figure 2:
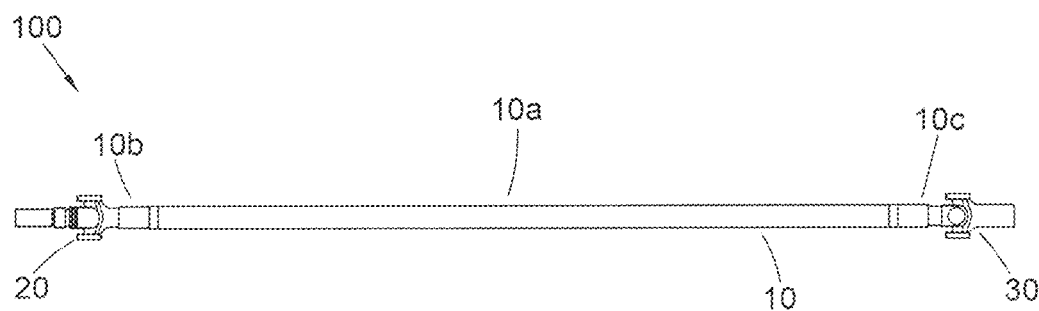
FIG. 2 shows a perspective view of an exemplary embodiment of a transmission shaft in accordance with the present disclosure.

The proposed solution to this problem is shown in FIGS. 2 to 10B. FIG. 2, for example, shows a transmission shaft 100 that includes a rod 10 which comprises a first end 10b connected to the input side 20 of the transmission shaft and a second end 10c connected to the output side 30 of the transmission shaft 100. Between the first and second ends, the rod 10 provides the transmission shaft 100 with a torsional compliant central section 10a. Thus the rod 10, through this torsional compliant section, sets the torsional stiffness of the transmission shaft 100.

The rod 10 has a cross-section which extends in a longitudinal direction to define a central core 200 for transmitting torque directly from the first end 10b to the second end 10c. This is seen more easily with reference to FIGS. 3A through to 10B. The cross-section also defines a radially outer section 270 comprising a plurality ribs 210 which extend radially and longitudinally from an outer periphery 260 of the central core 200. These ribs 210 are for increasing transverse stiffness of the rod 10. While their presence may increase the torsional stiffness of the rod 10 to a very limited extent, this is not their primary role; their primary role is to provide transverse stiffness and to resist vibrations and deflections in the transmission shaft 100, so as to avoid damage to the transmission shaft 100 or any neighbouring component. Thus the ribs 210 are essentially "decoupled" from the torque transmission, in the sense that there is no direct transmission of torque between the first end 10b and the second end 10c through the ribs 210. More particularly there may be no direct transmission of torque, as far as possible, between the input side 20 and the first end 10b through the ribs 210 and/or between the output side 30 and the second end 10c through the ribs 210.

The central core 200 of the rod 10 is configured to transmit torque from the input side 20 to the output side 30 of the transmission shaft 100 through the first end 10b and second end 10c of the rod 10. The central core 200 may be responsible for transmitting substantially all of the torque, for example, more than 90% of the torque, may be more than 95% of the torque, more than 98% of the torque, or even more than 99% of the torque.

As can be seen in the figures, the cross-section of the torsionally compliant section 10a of the rod 10 also defines a radially outer section 270, which may extend a majority of the length of the rod 10. The radially outer section 270 comprises a plurality of stiffening ribs 210 extending from the outer periphery 260 of the central core 200 of the rod 10. These ribs 210 may be continuous and extend along the entire length of the rod 10. Alternatively they may include breaks or may only extend along a portion of the rod 10.

The ribs 210 are configured to resist lateral deflection in the rod 10 during operation through vibration or sudden spikes of torque, and have no significant effect on the torsional compliance of the central core 200 of the rod 10 (e.g., less than 10%, may be less than 5%, less than 2%, or even less than 1% effect). This allows the rod 10 to provide a desired degree of torsional compliance while also limiting the amount of transverse deflection that can result from vibrational oscillations and deflection in the rod 10.

There may be no direct connection between the ribs 210 of the radially outer section 270 and the input and output sides 20, 30 of the transmission shaft 100. Only the central core 200 of the rod 10 may be connected to the input and output sides 20, 30 for the purposes of transmitting torque, making the central core 200, 300 the primary load path for the torque.

The central core 200, 300 may have an outer diameter dimension which is more than twice the lateral thickness of any or each rib. It may have an outer diameter dimension of three, four, five, six or more times the lateral thickness of the ribs 210. Thus the core is configured to provide desired torsional compliance characteristics for the transmission shaft 100 in a dedicated part of the rod 10 having a generally cylindrical form.

The ribs 210 may appear elongate in a radial direction when viewed in transverse cross-section. For example, they may extend radially a distance of three times longer than they are wide or more, optionally the radial distance (height) may be four, five, six times, or more the lateral width dimension.

The ribs 210 may be arranged symmetrically about an axis of the rod 10. For example, for every rib 210, there may be a diametrically opposed rib 210 arranged on the other side of the rod 10.

There maybe three or more ribs 210, for example, four, six, eight or ten ribs 210, symmetrically arranged around the central core 200.

The ribs 210 may include a flange 220, 240, for example, at a distal end of the respective rib 210, to improve the lateral stiffness of the transmission shaft 100. A flange 220, 240 may also be provided at other locations on the ribs 210 to improve the lateral stiffness of the transmission shaft 100. Such flanges 220, 240 may extend laterally from the radial extension of the rib 210, for example, in a straight, tangential configuration 240 or a curved, circumferential configuration 220. In such an embodiment, flanges 220, 240 may be provided on each rib 210 or on every other rib 210. The laterally extending flange 220, 240 of one rib 210 should be spaced from the laterally extending flange 220, 240 of an adjacent rib 210 such that an axially-extending gap 280 is present between the flanges 220, 240 under all working torsional loads. In this way, a load path cannot develop between the flanges 220, 240.

The ribs 210 of the radially outer section 270 of the rod 10 may increase the lateral stiffness of the transmission shaft 100 by more than 10%, 25%, 50%, 75%, 90%, or even more than 100%.

Through the addition of the ribs 210, the amount of deflection in the transmission shaft 100 during oscillations is reduced significantly. It may reduce the oscillation amplitude by 50% or more, for example, by more than 75%. In some embodiments the oscillation amplitude of the transmission shaft 100 is reduced by up to 90% compared to a transmission shaft 100 having a similar central core 200 but without the associated ribs 210.

The ribs 210 may be made of the same material as the rod 10, ensuring compatibility with the rod 10. For example, the rod 10 may be formed by extrusion or pultrusion to produce a rod 10 having ribs 210 that is made of a uniform material, for example, a lightweight metal alloy or a composite material. It would also be possible to make the ribs 210 from a material with a higher stiffness than the torsional compliant section of the rod 10. For example, they may be reinforced with fibres in a different orientation or made from a stiffer aluminium alloy, steel, superalloy material, etc., than the central core 200 of the rod 10. Such processing may be achievable through three-dimensional fabrication techniques or through known hardening techniques.

In applications this may equate to reducing oscillation amplitude to below 50 mm on a 1.5 m long transmission shaft 100 (for example, reducing oscillation amplitude to less than 5% of the length, or substantially smaller amounts). Indeed oscillation amplitudes may be reduced below 30 mm, or even less than 25 mm on such a transmission shaft 100 subjected to a HLSD curve P (+/−10G n–pk) of the DO160G test.

As indicated above, the rod 10 comprising the torsional compliant section 10a and the radially outer section 270 may be manufactured by extrusion. The extrusion apparatus can be provided with a die corresponding in shape to the intended cross-section of the rod 10. Extrusion also offers the possibility to produce the central core 200 with a hollow centre (central hollow 300), as a way to reduce the overall weight of the rod 10. Alternatively the rod 10 may be manufactured by pultrusion, for example, where fibres are pulled through a die drawing matrix material with them to produce a profiled product with fibres running along the centre. Such techniques can produce accurate cross-sections for a rod 10 which has multiple ribs 210 and flanges 220, 240 as well as a central core 200. The rod 10 can be machined afterwards to remove portions of ribs 210, for example, to decouple the ribs 210 as a primary load path for transmitting torque from the first end 10b to the second and of the rod, or to tune the vibrational characteristics of the rod.

While the central core 200 and radially outer section 270 may be formed as one piece for ease of production, the ribs 210 could also be formed separately and connected to the central core 200. The rib connections with the central core 200 could be made by a suitable fusion technique, for example, welding, brazing, soldering, an adhesive or any other type of joining method.

FIG. 3A shows a first exemplary cross section of the central section 10a of the rod 10. The cross section comprises a central core 200 which is circular in cross-section. It will be appreciated that the central core 200 of the rod 10 may be other profiles, for example, the central core 200 may include fillet portions or maybe more angular in the spaces between the ribs 210. The input side 20 and output side 30 of the transmission shaft 100 are coupled to the first end 10b and second end 10c of the rod 10 respectively through a first circumferentially extending interface and a second circumferentially extending interface 290 (see FIGS. 10A and 10B) in order to deliver torque into and out of the rod 10 (to then pass along the torsional compliant section 10a from the first end 10b directly to the second end 10c). There may be an absence of a mechanical interface beyond the outer periphery 260 of the central core 200 between the ends 10b, 10c of the rod 10 and the components providing the input side 20 and the output side 30 of the transmission shaft 100. For example, the mechanical interface may be between a first portion of a circumferential outer surface 260 (outer periphery) of the central core 200 and a circumferential inner surface of a fitting providing the first side 20. A second portion of the circumferential outer surface 260 of the central core 200 may provide a similar mechanical interface with a circumferential inner surface of a fitting providing the second side 30 of the transmission shaft 100.

In this embodiment the ribs 210, in addition to extending along the length of the torsional compliant section (i.e. longitudinally), extend in a radial direction to the flanges 220, 240, to provide an outer dimension of the rod 10.

Figure 12:
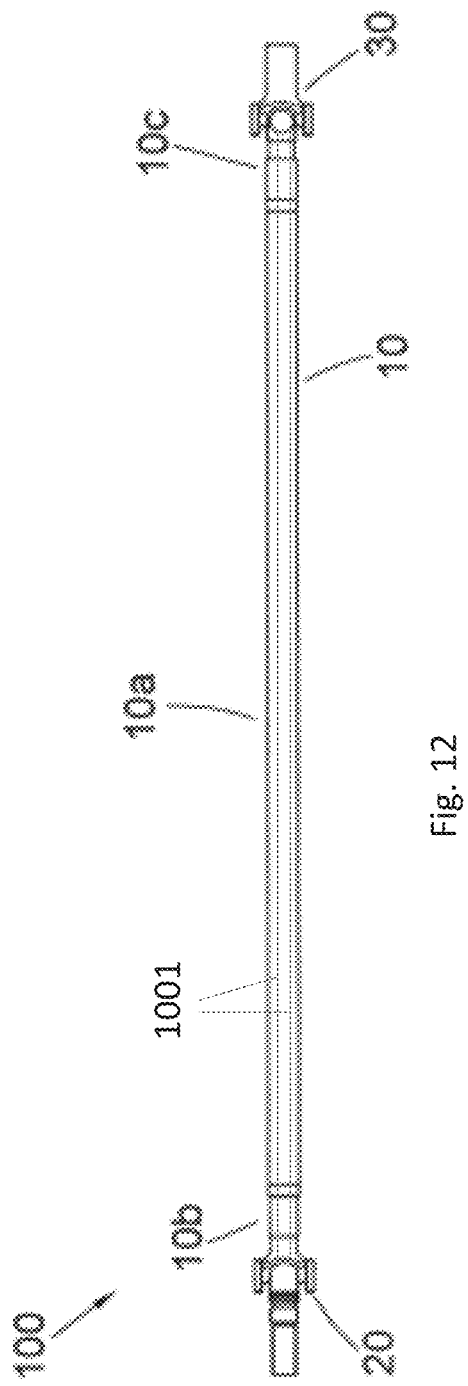
FIG. 12 shows a rod with fibres.

The rod may comprise fibres 1001 extending longitudinally the entire length of the rod as shown in FIG. 12.

The embodiment of FIG. 3A comprises four ribs 210 arranged to stiffen the rod, each separated by 90 degrees around the circumference of the central core 200. It will be appreciated that any number of ribs 210 can be used. The ribs 210 may be arranged as pairs, with one rib 210 arranged diametrically opposed to the other rib 210 of the pair.

The radially outer end of each rib may be connected to a laterally extending flange 220, for example, in the form of a circumferentially extending flange. Each circumferentially extending flange 220 may follow around an arc of the circumference of the outer section 270. However, the outer circumference is not continuous. In the embodiment each circumferentially extending flange 220 is of equal width and separate, and so the circumferential spacing between each arc portion is also equal. The axially extending gaps between the flanges 220, 240 helps to ensure that torque is not transmitted through the flanges 220, 240 (via the ribs) from the first end 10b to the second end 10c of the rod, and instead the central core 200 remains the primary load path for the torsional forces.

Figure 5A:
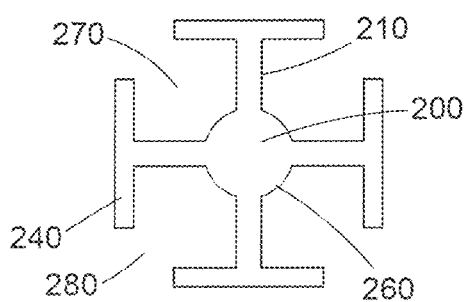
FIG. 5A shows a cross-section of a central section of an exemplary transmission shaft in accordance with the present disclosure comprising a solid core.

Circumferentially extending flanges 220 as compared to tangentially extending flanges 240 offer benefits in terms of aerodynamic operation. However, as shown in FIG. 5A, the laterally extending flange can be in the form of a tangentially extending flange 240, which might offer benefits in terms of ease of construction.

Each laterally extending flange 220, 240 is also depicted at the radially outermost end of the rib 210. This allows the width of the flange 220, 240 to be maximised, improving the transverse stiffness the rib 210 is able to add to the rod 10. With such flanges 220, 240, there is also a cost in terms of additional rotational weight, and so the stiffness benefit of such flanges 220, 240 would have to be assessed taking into account such factors. Alternatively or in addition to these flanges 220, 240, a circumferentially or tangentially extending flange may be formed at any distance along the rib 210. For example the flange may be at 25%, 50%, or 75% the distance between the outer periphery 260 of the central core 200 and the radially outermost end of the rib 210.

It will be appreciated that some of the laterally extending flanges 220, 240 may cover a larger portion of the circumference of the rod 10 than others, meaning that the circumferential spacing 280 between each laterally extending flange 220, 240 may also differ. The sizing of each laterally extending flange 220, 240 will be determined by the expected load distribution in the rod 10.

The cross-section of the rod 10 may be uniform in diameter. Alternatively the diameter of the central core 200, the length of the ribs 210 and the circumferentially extending flanges 220, 240 may vary along the length of the rod 10. Increasing the diameter of the central core 200 of the rod 10 will increase the torsional stiffness and reduce the torsional compliance of the rod 10, and vice versa. Similarly increasing the length of the ribs 210 in the radial direction will further increase the lateral stiffness of the rod. Adjustments, e.g., through machining or other forming processes, may be made to the profile to help tune the vibrational characteristics of the rod 10 and the transmission shaft 100.

The ribs 210 are positioned so that they increase the lateral stiffness of the rod 10 when in use, but do not significantly affect the torsional compliance of the central core 200 of the rod 10. It will be appreciated that the torsional compliance of the rod 10 as a whole will also be reduced slightly due to the presence of the material of the ribs 210, however this can be taken into account when designing the transmission shaft 100 to have particular levels of torsional compliance, e.g., as required to smooth out occasional torque spikes which can be anticipated during the operation of the component.

Thus, the present disclosure also provides a method of designing a transmission shaft 100 comprising a rod 10 with a central core 200 to provide the transmission shaft 100 with a torsional compliant section 10a having a desired torsional stiffness and a plurality of longitudinally and radially extending ribs 210 arranged about the central core 200 to improve the transverse stiffness of the rod, wherein the transmission shaft 100 is configured so that the ribs 210 are, as far as possible, decoupled from transmitting torque between an input side 20 and an output side 30 of the transmission shaft 100, and wherein an outer diameter of the central core 200 is selected to be smaller than an outer diameter which is calculated to provide the desired torsional stiffness for a rod 10 having no ribs 210, wherein the reduction in outer diameter takes account of a contribution to overall torsional stiffness which is provided by the provision of the decoupled ribs 210. For example, the outer diameter dimension may be between 0.05% and 1% smaller, optionally less than 0.5% smaller, than for a rod 10 having no ribs 210 that is able to provide the same torsional stiffness. The present disclosure also provides a method of transmitting torque along a transmission shaft 100, the transmission shaft 100 comprising a rod 10 with a central core 200 to provide the transmission shaft 100 with a torsional compliant section having a desired torsional stiffness and a plurality of longitudinally and radially extending ribs 210 arranged about the central core 200 to improve the transverse stiffness of the rod, wherein the transmission shaft 100 is configured so that the ribs 210 are, as far as possible, decoupled from transmitting torque between an input side 20 and an output side 30 of the transmission shaft 100, the method comprising introducing torque into the rod 10 from the input side through the central core 200 only, the rod 10 transmitting the torque along the central core 200 directly to the output side 30 of the transmission side of the transmission shaft 100.

The central section 10a of the rod 10 with the cross section shown in FIG. 3A can be formed by extrusion or pultrusion. This would enable the part to be made as one piece. The profiled portion of the rod 10 with the cross section of FIG. 3A may then be connected to a first shaft portion and a second shaft portion at the ends of the rod, for example, through a mechanical connection or through being fused or bonded together to create a mechanical interface. The mechanical interface may have a radial extent corresponding to the cross-sectional profile of the central core 200 so that torque is transmitted directly into the central core 200 rather than the ribs 210. Alternatively, the ribs 210 may be machined to remove the ribs 210 to provide a first shaft portion and a second shaft portion at the ends of the rod 10 without ribs 210 or with the ribs 210 decoupled. The first and second shaft portions can be connected to flexible couplings providing the input side 20 and the output side 30 of the transmission shaft 100 where the torque is inputted and outputted from the transmission shaft 100. The flexible couplings 70 can be arranged to deliver the torque through a circumferentially extending interface 290 with the rod 10, for example, in the form of a male/female connection comprising bonded or fused parts, and/or some form of mechanical connection, such as rivets or splined surfaces (see FIGS. 10A and 10B).

FIG. 3B shows another exemplary cross-section for the central section 10a of the rod 10 10. The cross section shown in FIG. 3B matches that of FIG. 3A in that it also comprises a central core 200 with a required degree of torsional compliance, four ribs and a circumferential flange connected to each rib.

The central core 300 of the cross section shown in FIG. 3B comprises a void 300, rather than the solid construction shown in FIG. 3A. A hollow central core 300 will have a higher torsional compliance (lower torsional stiffness) compared to a solid central core of the same diameter, but less overall strength. It also requires a more complex mandrel for the extrusion or pultrusion operation. A benefit of the hollow central core 300 is that the rod 10 will require less material, hence reducing costs and also making the transmission shaft 100 lighter, leading to improvements in efficiency of the aircraft on which the transmission shaft 100 is employed.

FIGS. 4A and 4B show further exemplary cross-sections of the rod 10. FIG. 4A comprises a central core 200, eight ribs 210 extending from the peripheral surface of the central core and circumferentially extending flanges 220 at the outer end of each rib 210. The stiffening ribs 210 are separated by 45 degrees. The cross section of the rod 10 shown in FIG. 4A differs from the cross section shown in FIG. 3A in that there are four additional ribs 210 and corresponding circumferentially extending flanges 220.

The more ribs 210 present around the peripheral surface of the central core 200 the higher the lateral stiffness of the rod 10. It also provides a more even lateral stiffness in different directions, leading to reduced deflections and oscillations.

Increasing the number of ribs 210 also further reduces the torsional compliance of the rod 10 as a whole. There is therefore a trade-off between providing a rod 10 that is sufficiently stiff in a transverse direction, while still providing the required torsional compliance. Experimentation or finite analysis may be conducted with different central core diameters, rib radial length, and numbers of ribs 210 to determine the best combination for torsional stiffness, transverse stiffness, weight considerations and other factors.

The cross section shown in FIG. 4B corresponds to the cross section shown in FIG. 4A, except that the central core 200 is hollow, similar to FIG. 3B. The reduced torsional compliance in the rod 10 from the additional ribs 210 may be offset, at least in part, by making the central core 200 hollow.

FIG. 5A shows another cross section of the central section 10a of the rod 10 of the present disclosure. FIG. 5A comprises a solid central core 200 and four ribs 210 extending from the outer periphery 260 of the central core 200, as in FIG. 3A.

The cross section in FIG. 5A further includes laterally extending flanges 240 at the radially outer point of each stiffening rib, this time presented as tangentially extending flanges 240. The tangentially extending flanges 240 in FIG. 5A are straight (planar), as opposed to the curved (arcuate) circumferentially extending flanges 220 shown in FIG. 3A. In FIG. 3A, the circumferentially extending flanges 220 together form an overall circular cross section (providing the appearance of a cylindrical rod), whereas in FIG. 5A they collectively form an overall square cross section (providing the appearance of a square bar), each of these arrangements comprising longitudinally extending gaps 280 between the flanges 240.

The straight, tangentially extending flanges may be simpler to manufacture and also may provide additional stiffness to the rod 10 compared to the circumferentially extending flanges 220, providing more of an I-beam effect. However the circumferentially extending flanges 220 can offer benefits in terms of improved aerodynamics. Thus one form may be more suited for a particular situation than the other.

As with the curved, circumferentially extending flanges 220, the tangentially extending flanges 240 can be positioned at any point along the radial length of the ribs 210. Additionally, each of the tangentially extending flanges 240 can be of equal size, or if desired, there may be differences in size, e.g. alternate pairs of ribs 210 and flanges, so the spacing between them may also different in size.

Figure 5B:
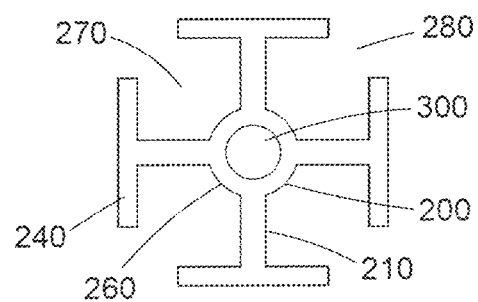
FIG. 5B shows a cross-section of a central section of an exemplary transmission shaft in accordance with the present disclosure comprising a hollow core.

FIG. 5B shows another cross section of the rod 10 which corresponds to the cross section in FIG. 5A but the central core 200 comprises a central void 300 and is hollow instead of solid, similar to the embodiment in FIG. 3B.

Figure 6A:
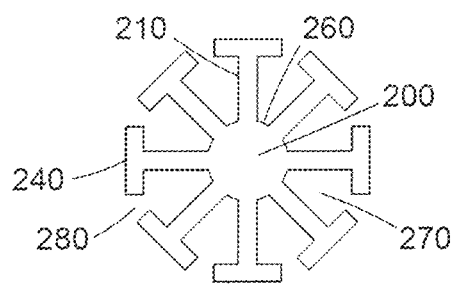
FIG. 6A shows a cross-section of a central section of an exemplary transmission shaft in accordance with the present disclosure comprising a solid core.
Figure 6B:
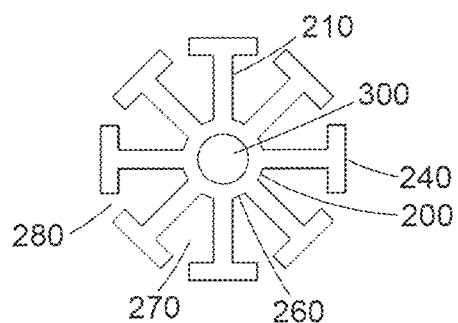
FIG. 6B shows a cross-section of a central section of an exemplary transmission shaft in accordance with the present disclosure comprising a hollow core.

FIGS. 6A and 6B show further cross sections of the rod 10. Both cross sections show a central core 200 and eight ribs 210 extending from the outer periphery 260 of the central core 200. The central core 200 in FIG. 6A is solid, while the central core 200 in FIG. 6B comprises a central void 300 and is hollow. Similar to FIGS. 5A and 5B the laterally extending flanges 240 are straight, as opposed to the curved, circumferentially extending flanges in FIGS. 4A and 4B.

FIGS. 7A-8B show further exemplary cross sections of the central section 10a of the rod 10, each including a central core and symmetrically arranged, radially extending ribs 210. The cross sections of FIGS. 7A and 8A have a solid central core 200, while the cross sections of FIGS. 7B and 8B have a hollow central core 200 comprising a central void 300. Furthermore, the cross sections of FIGS. 7A and 7B have four ribs 210, while the cross sections of FIGS. 8A and 8B each have eight ribs 210.

In all four embodiments of FIGS. 7A to 8B, circumferentially extending flanges 220 are not present at any point along the stiffening ribs 210. This may be beneficial in some scenarios in that it leads to material and rotational weight savings.

Figure 9A:
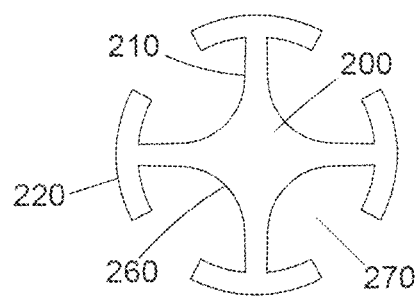
FIG. 9A shows a cross-section of a central section of an exemplary transmission shaft in accordance with the present disclosure comprising a solid core and filleted portions.
Figure 9B:
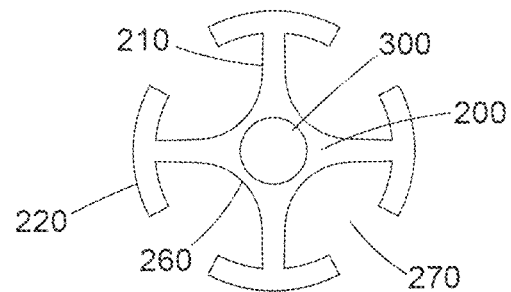
FIG. 9B shows a cross-section of a central section of an exemplary transmission shaft in accordance with the present disclosure comprising a hollow core and filleted portions.

FIGS. 9A and 9B show other exemplary embodiments, with a central core 200 being either solid or hollow and ribs 210 extending from the central core 200 to laterally (circumferentially) extending flanges 220. In this embodiment there is a fillet portion 260 present between adjacent ribs 210. The fillet portion 260 strengthens the connection between the stiffening ribs 250 and the central core 300 by reducing stress concentrations. This means that the stiffening ribs 210 may be made of a lighter material without failing. The fillet portion 260 may also increase the lateral stiffness of the rod 10 and reduce the torsional compliance of the rod 10 but this can be factored into the design of the rod 10 for the transmission shaft 100.

It will be appreciated that the fillet portions 260 shown in FIGS. 9A and 9B, may be applied to any of the preceding cross sections. There may be more or less than four ribs 210, and the laterally extending flanges 220, 240 may be straight or curved depending on the design requirements of the rod 10 and the overall torsional response required of the transmission shaft 100.

Typically, when the central core 200 is hollow, the ends 10b, 10c will also be hollow. However, the ends 10b, 10c may be solid, even if the core 200 is hollow. Similarly, if the central core 200 is solid, the ends 10b, 10c may be hollow, or the ends 10b, 10c may also be hollow.

Figure 10A:
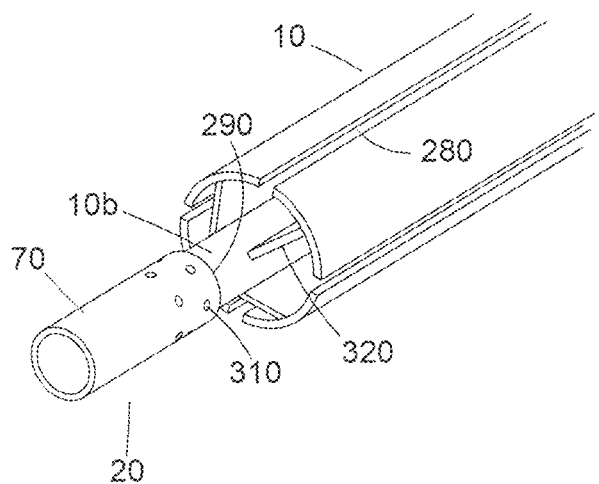
FIG. 10A shows a riveted fitting of an end of the transmission shaft.
Figure 10B:
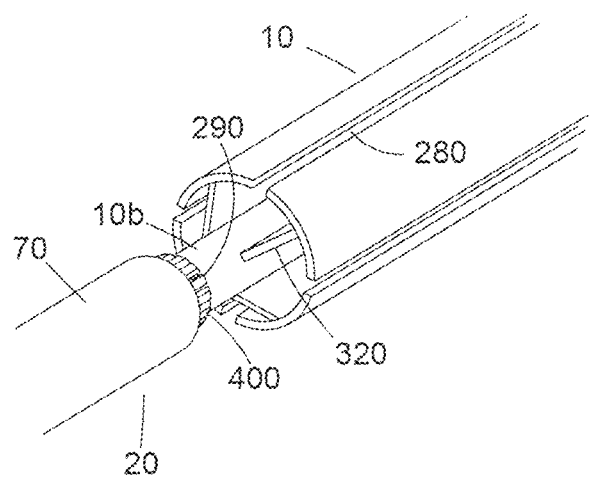
FIG. 10B shows a spline fitting of an end of the transmission shaft.

FIGS. 10A and 10B show two exemplary embodiments of the circumferential coupling arrangement between the first end 10b and the input side 20. A similar arrangement may be provided between the second end 10c and the output side 30.

In FIG. 10A the flexible coupling 70 is shown coupled to the first end 10b of the rod 10 using rivets 310, screws, bolts or other types of fastener. In this way the torsional forces are transmitted from the fitting across the circumferential interface 290 between the flexible coupling 70 and the circumferential surface of the first end 10b of the rod 10 (i.e., in a location ahead of the ribs 210). By contrast, the torsional compliant central section 10a is not coupled to the flexible coupling 70 by rivets 300 or other fastener that can transmit torsional forces; only the first end 10b extending form the central core 200 of the torsional compliant central section 10a is riveted to the flexible coupling 70. Therefore there is no direct coupling between the input side 20 and the ribs 210 and the flanges 220, 240. This means that the ribs 210 and the flanges 220 will only have a very limited effect on the torque transmitted through the transmission shaft 100.

FIG. 10B shows the fitting 80 as a splined fitting engaging a plurality of splines 400 provided around the circumference of the central core 200 at the first end 10b.

As shown in FIGS. 10A and 10B, the end surfaces 320 of the ribs 210 are spaced from the circumferentially extending interface between the flexible coupling 70 of the input side 20 and the first end 10b of the rod 10.

Other fitting types can also be used, either alternatively or in combination with the arrangements described above. For example the ends of the rod 10 may be glued, welded or otherwise fused, or press-fitted.

Each of the fitting types may be used for both the solid core 200 and the hollow core. Typically both the first end 10b and second end 10c of the rod 10 can be connected to the flexible coupling 70 by the same method. However they may use different forms of connection, for example the first end 10b may be connected to the flexible coupling 70 by rivets 310 and the second end 10c may be connected to the flexible coupling by a spline fitting 400.

The invention claimed is:

1. A transmission shaft for an aircraft comprising:
a first side for inputting torque;
a second side for outputting torque; and
a composite rod comprising fibres extending longitudinally the entire length of the rod, the rod extending in a longitudinal direction between the first side and the second side to transfer torque along the transmission shaft, the rod comprising:
a first end provided at the first side;
a second end provided at the second side; and
a torsional compliant section extending therebetween providing the transmission shaft with a torsional stiffness,
wherein the transmission shaft is configured for driving an actuator in a wing of the aircraft,
wherein the torsional compliant section comprises a cross-section which extends in the longitudinal direction to define a central core for transmitting torque directly from the first end to the second end and a radially outer section comprising a plurality ribs which extend radially and longitudinally from an outer periphery of the central core for increasing transverse stiffness of the rod, wherein the first end of the rod and the first side of the transmission shaft are coupled through a first circumferentially extending interface to deliver torque into the torsional compliant section, and the second end of the rod and the second side of the transmission shaft are coupled through a second circumferentially extending interface to deliver torque out of the torsional compliant section, wherein end surfaces of the ribs of the torsional compliant section are spaced from the first and second circumferentially extending interfaces, and wherein the ribs or a plurality of the ribs comprise a laterally extending flange arranged at a radially outer end of the rib, the flange extending in a generally circumferential or tangential direction to the rib, and wherein each flange is arranged symmetrically at the radially outer end of the rib with the rib extending along a midline of the flange.

2. A transmission shaft as claimed in claim 1, wherein:
the first side is arranged to transmit torque into the first end of the rod through a first portion of a circumferential outer surface of the central core only, the ribs comprising first end surfaces which extend from the circumferential outer surface spaced from the first side and the first circumferentially extending interface so as to be functionally isolated from the inputted torque as the torque enters the first end of the rod, and the second side is arranged to transmit torque out of the second end of the rod through a second portion of the circumferential outer surface of the central core only, the ribs comprising second end surfaces which extend from the circumferential outer surface spaced from the second side and the second circumferentially extending interface so as to be functionally isolated from the outputted torque as the torque exits the second end of the rod.

3. A transmission shaft as claimed in claim 1, wherein the first circumferentially extending interface between the first end of the rod and the first side of the transmission shaft is arranged to deliver torque into the torsional compliant section through radially extending fasteners.

4. A transmission shaft as claimed in claim 3, wherein the radially extending fasteners are rivets.

5. A transmission shaft as claimed in claim 1, wherein the first circumferentially extending interface between the first end of the rod and the first side of the transmission shaft is arranged to deliver torque into the torsional compliant section through a splined connection, an adhesive connection and/or a fused connection.

6. A transmission shaft as claimed in claim 1, wherein:
the rod comprises a continuous cross-section.

7. A transmission shaft as claimed in claim 1, wherein the central core has an outer diameter dimension which is more than twice the lateral thickness of any rib.

8. A transmission shaft as claimed in claim 7, wherein the central core has an outer diameter dimension which is three times or more the lateral thickness of any rib.

9. A transmission shaft as claimed in claim 1, comprising a first flexible coupling provided at the first side with a universal joint or a self-aligning bearing for inputting torque and a second flexible coupling provided at the second side with a universal joint or a self-aligning bearing for outputting torque.

10. A transmission shaft as claimed in claim 1, wherein the rod has four or more ribs arranged around the central core.

11. A transmission shaft as claimed in claim 10, wherein the rod has six ribs.

12. A transmission shaft as claimed in claim 10, wherein the rod has eight ribs.

13. A method of making a transmission shaft for an aircraft, the transmission shaft comprising a first side for inputting torque, a second side for outputting torque, a composite rod comprising fibres extending longitudinally the entire length of the rod, the rod extending in a longitudinal direction between the first side and the second side to transfer torque along the transmission shaft, the rod comprising a first end provided at the first side, a second end provided at the second side and a torsional compliant section extending therebetween providing the transmission shaft with a torsional stiffness, wherein the transmission shaft is configured for driving an actuator in a wing of the aircraft, wherein the rod comprises a cross-section which extends in the longitudinal direction to define a central core for transmitting torque directly from the first end to the second end and a radially outer section comprising a plurality ribs which extend longitudinally and radially from an outer periphery of the central core for increasing transverse stiffness of the rod, wherein the method comprises:

coupling the first side to the first end through a first circumferentially extending interface which is able to deliver torque into the torsional compliant section; and coupling the second end of the rod to the second side of the transmission shaft through a second circumferentially extending interface which is able to deliver torque out of the torsional compliant section;

wherein end surfaces of the ribs are spaced from the first and second circumferentially extending interfaces; and wherein the method further comprises forming at least a plurality of the ribs with a circumferentially or tangentially extending flange and wherein each flange is formed symmetrically at a radially outer end of the respective rib.

14. A transmission shaft for an aircraft comprising:
a first side for inputting torque;
a second side for outputting torque; and
a composite rod comprising fibres extending longitudinally the entire length of the rod, the rod extending in a longitudinal direction between the first side and the second side to transfer torque along the transmission shaft, the rod comprising:
a first end provided at the first side;
a second end provided at the second side; and
a torsional compliant section extending therebetween providing the transmission shaft with a torsional stiffness,
wherein the transmission shaft is configured for driving an actuator in a wing of the aircraft,
wherein the torsional compliant section comprises a cross-section which extends in the longitudinal direction to define a central core for transmitting torque directly from the first end to the second end and a radially outer section comprising a plurality ribs which extend radially and longitudinally from an outer periphery of the central core for increasing transverse stiffness of the rod,
wherein the first end of the rod and the first side of the transmission shaft are coupled through a first circumferentially extending interface to deliver torque into the torsional compliant section, and the second end of the rod and the second side of the transmission shaft are coupled through a second circumferentially extending interface to deliver torque out of the torsional compliant section, wherein end surfaces of the ribs of the torsional compliant section are spaced from the first and second circumferentially extending interfaces; and wherein:

the ribs are arranged around a hollow central core, and/or wherein fillet portions are provided at the radially inner end of the ribs where they join the outer periphery of the central core.

\* \* \* \* \*